United States Patent
Arslan et al.

(10) Patent No.: US 11,632,281 B1
(45) Date of Patent: Apr. 18, 2023

(54) SYSTEM AND METHOD FOR JOINT RADAR-SENSING AND COMMUNICATION WAVEFORM UTILIZING UNIQUE WORD OFDM (UW-OFDM)

(71) Applicant: University of South Florida, Tampa, FL (US)

(72) Inventors: Huseyin Arslan, Tampa, FL (US); Mehmet Mert Sahin, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/544,031

(22) Filed: Dec. 7, 2021

Related U.S. Application Data (60) Provisional application No. 63/199,101, filed on Dec. 7, 2020.

(51) Int. Cl.
*H04W 16/28* (2009.01)
*H04L 27/26* (2006.01)
*G01S 7/00* (2006.01)
*H04B 1/69* (2011.01)

(52) U.S. Cl.
CPC ......... H04L 27/2634 (2013.01); G01S 7/006 (2013.01); H04B 1/69 (2013.01); *H04B 2001/6912* (2013.01); *H04W 16/28* (2013.01)

(58) Field of Classification Search
CPC .............. H04L 27/2613; H04L 5/0048; H04L 5/0007; H04L 27/2655; H04L 27/2607; H04L 25/0224; H04L 27/2675; H04L 27/26134; H04W 24/02; H04W 72/0413; H04W 74/0833; H04W 56/00; H04W 72/0453; H04W 72/0466; H04W 24/08; H04W 52/52; H04W 16/28; H04W 24/10; H04W 52/04; H04W 72/046; H04W 72/20; H04W 72/23; H04B 7/02; H04B 7/0452; H04B 1/7075; H04B 1/7093; H04B 17/318; H04B 7/0413; H04B 1/7083; H04B 11/00
USPC ........................................................ 375/139
See application file for complete search history.

(56) References Cited

U.S. PATENT DOCUMENTS

| | | | |
|---|---|---|---|
| 11,031,978 B2 * | 6/2021 | Klemmer | H04B 7/0421 |
| 2007/0183518 A1 * | 8/2007 | Ma | H04L 27/2662 375/260 |
| 2020/0083995 A1 * | 3/2020 | Suzuki | H04L 5/001 |
| 2021/0286045 A1 * | 9/2021 | Bayesteh | G01S 7/006 |

OTHER PUBLICATIONS

Arslan, H. et al., Channel estimation in narrowband wireless communication systems, Wireless Commun. and Mobile Comp., vol. 1, No. 2, p. 201-219, 2001.

(Continued)

*Primary Examiner* — Eva Y Puente
(74) *Attorney, Agent, or Firm* — Smith & Hopen, P.A.; Molly L. Sauter (57) ABSTRACT

A system and method utilizing a novel waveform structure based on unique word (UW)—orthogonal frequency division multiplexing (OFDM) is proposed for the applications of joint radar-sensing and communication (JRC). A predetermined chirp sequence is used as the UW in the waveform. The predetermined chirp sequence is used to perform radar functionality, which also increases power efficiency of linear power amplifier that is critical for radar applications.

16 Claims, 6 Drawing Sheets

(56) References Cited

OTHER PUBLICATIONS

Braun, M. OFDM Radar Algorithms in Mobile Communication Networks, Ph.D. dissertation, Karlsruher Institute for Technology (KIT), 2014.

Fink, J. et al., Comparison of OFDM radar and chirp sequence radar, in 2015 16th International Radar Symposium (IRS), pp. 315-320, 2015.

Hlawatsch, F. et al., Wireless communications over rapidly time-varying channels, Elsevier/Academic Press, 2011.

Huemer, M. et al., Classical and bayesian linear data estimators for unique word OFDM, IEEE Trans. Signal Process, vol. 59, No. 12, pp. 6073-6085, 2011.

Huemer, M. et al., Nonsystematic complex number RS coded OFDM by unique word prefix, IEEE Trans. Signal Process, vol. 60, No. 1, pp. 285-299, 2012.

Khorov, E. et al., A tutorial on IEEE 802.11ax high efficiency WLANs, IEEE Commun. Surveys Tuts., vol. 21, No. 1, pp. 197-216, 2019.

Liu, F. et al., Joint radar and communication design: Applications, state-of-the-art, and the road ahead, IEEE Trans. Commun., pp. 1-30, 2020.

Zhang, J. A. et al., Enabling joint communication and radar sensing in mobile networks—a survey, ArXiv, vol. abs/2006.07559, 2020.

Rajabzadeh, M. et al., Power spectral analysis of UW-OFDM systems, IEEE Trans. Commun., vol. 66, No. 6, pp. 2685-2695, 2018.

Sahin, M. M. et al., Waveform-Domain NOMA: The Future of Multiple Access, in 2020 IEEE International Conference on Communications Workshops (ICC Workshops), 2020, pp. 1-6.

Sahin, M. M. et al., Multi-functional coexistence of radar-sensing and communication waveforms, ArXiv, vol. abs/2007.05753, 2020.

Steendam, H. et al., Theoretical performance evaluation and optimization of UW-OFDM, IEEE Trans. Commun., vol. 64, No. 4, pp. 1739-1750, 2016.

Sturm, C. et al., Waveform design and signal processing aspects for fusion of wireless communications and radar sensing, Proc. IEEE, vol. 99, No. 7, pp. 1236-1259, 2011.

Zheng et al., Radar and communication coexistence: An overview: A review of recent methods, IEEE Signal Process. Mag., vol. 36, No. 5, pp. 85-99, 2019.

Rappaport, T. S. et al., Overview of Millimeter Wave Communications for Fifth-Generation (5G) Wireless Networks—with a focus on Propagation Models, in IEEE Transactions on Antennas and Propagation, Special Issue on 5G, Nov. 2017.

\* cited by examiner

SYSTEM AND METHOD FOR JOINT RADAR-SENSING AND COMMUNICATION WAVEFORM UTILIZING UNIQUE WORD OFDM (UW-OFDM)

CROSS-REFERENCE TO RELATED APPLICATIONS

The present application claims priority to currently U.S. Provisional Patent Application Ser. No. 63/199,101 filed on Dec. 7, 2020, the contents of which are incorporated by reference herein in their entirety.

BACKGROUND OF THE INVENTION

Realizing 5G, 6G, and beyond, systems require environmental awareness to leverage adjustable radio parameters to communication performance. New technologies, such as autonomous vehicles and environment-aware access points, require radar-sensing methods in addition to communication, which can be an additional burden on the spectrum. These requirements have led to the joint radar-communication (JRC) concept, which has gained a significant amount of attention, from both industry and academia.

JRC can be actualized using scheduling, data embedded radar waveforms or communication waveforms with radar capabilities including multi-carrier or single-carrier systems. While scheduling techniques make efficient use of hardware, they also limit the spectral efficiency. Previous work in the field has proposed the superimposed frequency modulated continuous-wave (FMCW) and orthogonal frequency division multiplexing (OFDM) waveform, a concept referred to as waveform-domain non-orthogonal multiple access (NOMA), to separately perform radar-sensing and communication functions. The solution provides good sensing accuracy with minimal degradation to communication performance due to slightly lower signal-to-noise ratio (SNR) as a result of overlapping with the FMCW chirps.

Data embedded radar waveforms are not able to provide the same data rate as communication waveforms, as the symbol rate is dependent on the chirp rate, and therefore reduce spectrum efficiency. Since OFDM is a well-accepted waveform among the communication community and has similar radar processing methods and results compared FMCW, it is the focus of the studies for the third option mentioned above. One study theorized and simulated the OFDM communication signal-based radar system, referred to as "RadCom" systems, in a vehicle-to-vehicle (V2V) scenario. This study implemented radar processing in the modulation domain, achieving higher dynamic range compared to correlation-based processing, showing that these systems have potential for JRC applications. The radar processing was performed by removing the cyclic prefix (CP) part of the OFDM signal, which causes degradation in maximum resolvable Doppler frequency.

While JRC systems are known in the art, a need exists for an improved joint radar-sensing and communication (JRC) transmission-reception system and method.

SUMMARY OF THE INVENTION

The present invention provides a system and method to resolve the shortcomings of prior art methods, in terms of data rate and radar capabilities respectively, of two waveforms—FMCW and OFDM—by incorporating the chirp sequences as the deterministic sequence in UW-OFDM. In addition to having the combined advantages of the individual waveforms, the proposed hybrid waveform has a more constant power profile, thereby increasing energy efficiency by reducing heat emissions.

Developing composite or hybrid waveform structures is an alternative path to realizing JRC systems. The FMCW consists of many highly correlated chirps, and therefore has high dynamic range and is able to detect multiple targets using periodogram based estimation. However, FMCW is lacking from the communication perspective. Unique word (UW)—OFDM is an alternative to classical CP-OFDM where instead of a random, data dependent prefix, a predefined sequence is added in the time domain. Another important distinction is that the UW is a part of the fast Fourier transformation (FFT) interval, whereas the CP is not. UW-OFDM has been proposed to utilize the otherwise discarded prefix for synchronization and channel estimation and is shown to have the same, if not better, bit-error rate (BER) under similar conditions. Non-systematic UW-OFDM has been proposed to reduce the load on the dedicated redundant subcarriers by spreading the energy among the other subcarriers, aiding in sidelobe suppression. Spreading the energy among the subcarriers also makes them correlated, which improves the BER performance.

In one embodiment, a method for assembling unique word (UW)— orthogonal frequency division multiplexing (OFDM) data symbols for use in joint radar-sensing and communication (JRC) is provided. The method includes, generating OFDM time domain symbols having $N_u$ zeroes at an output of an N-point inverse fast Fourier transformation (IFFT) block of a transmitter and adding a predetermined chirp sequence in the $N_u$ zeroes to assemble UW-OFDM symbols having a chirp sequence, wherein the UW is the predetermined chirp sequence for joint radar-sensing and communication (JRC). In a particular embodiment, first a code generator matrix of the transmitter is used to introduce redundancy into the OFDM frequency domain symbols, and then the OFDM frequency domain symbols having redundancy are modulated onto a plurality of subcarriers using the IFFT block to generate the OFDM time domain symbols having $N_u$ zeroes.

The method may be employed in both mono-static and bi-static joint radar-sensing and communication scenarios.

In an additional embodiment, a transmitter (or transmitter of a transceiver) is provided for assembling unique word (UW)—orthogonal frequency division multiplexing (OFDM) data symbols for use in joint radar-sensing and communication (JRC). The transmitter includes, an N-point inverse fast Fourier transformation (IFFT) block to generate OFDM time domain symbols having $N_u$ zeroes at an output and the transmitter is configured to add a predetermined chirp sequence in the $N_u$ zeroes to assemble UW-OFDM symbols having a chirp sequence, wherein the UW is the predetermined chirp sequence for joint radar-sensing and communication (JRC). The transmitter transmitted the assembled UW-OFDM symbols having a chirp sequence over a transmission channel and are received an a receiver (or a receiver of a transceiver). The receiver is configured to decode the UW-OFDM symbols having a chirp sequence using a best linear unbiased estimator (BLUE) that is matched to the code generator matrix.

In various embodiments, the present invention provides a novel transceiver design using UW-OFDM and chirp sequences for JRC systems. Additionally, efficient use of the power amplifier (PA) is expressed using coexistence of two different waveforms. The power spectral density of the proposed waveform is compared with CP-OFDM and FMCW, showing that lower out-of-band (OOB) emission is satisfied.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

Joint radar-communication (JRC) systems have been considered as enablers for 5G, 6G, and future technologies. Furthermore, JRC systems are vital in realizing other emerging technologies, such as vehicle-to-vehicle (V2V) communication and sensing for autonomous vehicles.

In various embodiments, the present invention provides a novel waveform structure based on unique word (UW)—orthogonal frequency division multiplexing (OFDM) for the application of joint radar-sensing and communication (JRC). As a UW in the waveform, the chirp sequence is used to perform radar functionality, which also increases power efficiency of linear power amplifier. The proposed waveform has been shown to perform well in both mono and bi-static systems.

In the following description, lower-case bold face variables (a, b, . . . ) indicate vectors and upper-case bold face variables (A, B, . . . ) indicate matrices. To distinguish between time and frequency domain variables, a tilde symbol is used to specify the frequency domain vectors and matrices (ã, Ã), respectively. Further, $\mathbb{C}$ is used to designate the set of complex numbers, $\lceil \cdot \rceil$ to denote ceil operation, $I_N$ to denote the N×N identity matrix, 0 to denote zero matrix with appropriate size, $(\cdot)^T$ to denote transpose, $\Re(\cdot)$ to denote real part of the complex value, $(\cdot)^H$ to denote conjugate transpose, $E(\cdot)$ to denote expectation. The null space of A is defined as $\mathcal{N}(A) \triangleq \{N_A \in \mathbb{C}^{n \times k} : AN_A = 0\}$.

Figure 1:
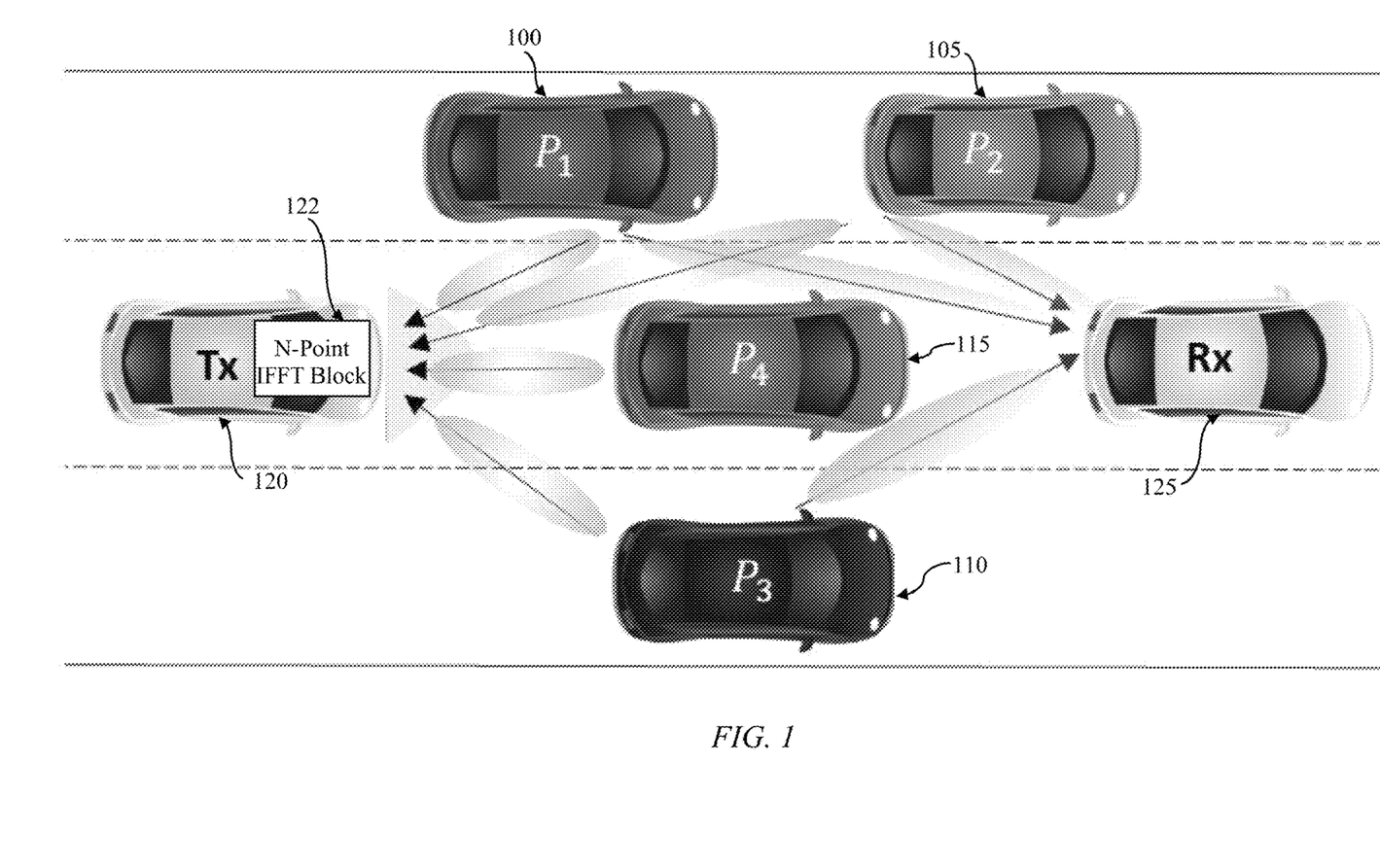
FIG. 1 illustrates an exemplary use case requiring both radar-sensing and communication functionality, in accordance with an embodiment of the present invention.
Figure 2A:
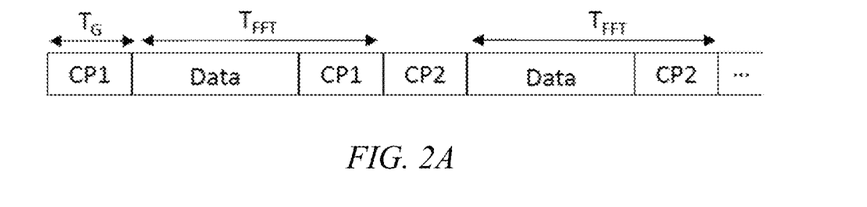
FIG. 2A illustrates a transmit frame design of an exemplary CP-OFDM waveform.
Figure 2B:
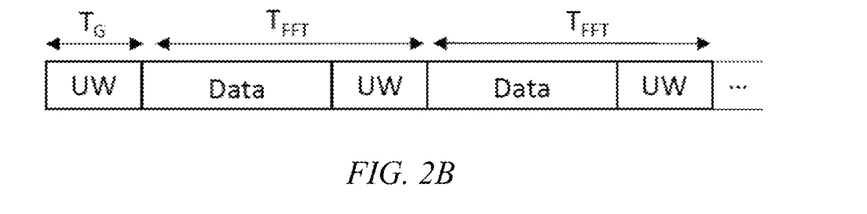
FIG. 2B illustrates a transmit frame design of an exemplary UW-OFDM waveform.

The V2V scenario illustrated in FIG. 1 is considered in the following description, however, this is not intended to be limiting and the proposed scheme is also applicable to a variety of different use cases. The proposed waveform structure may perform both mono and bi-static radar function in addition to providing communication.

As shown in FIG. 1, a transmitter 120, a receiver 125 and several targets 100, 105, 110, 115 are considered in this V2V scenario. As shown in FIG. 1, the transmitter 120 comprises an N-point inverse fast Fourier transformation (IFFT) block 122.

Let $c \in \mathbb{C}^{N_u \times 1}$ be a predefined chirp sequence, which is also referred to as a "unique word". It is defined as follows:

$$c = \{c_k\}_{k=1}^{N_u} = \exp\left(\frac{j\pi\beta}{\tau}\left(\frac{k}{F_s}\right)^2\right) \quad (1)$$

where $F_s$, $\beta$, and $\tau$ denote the sample rate, the allocated bandwidth and the time duration of the chirp signal, respectively. As in conventional OFDM, the complex data symbols, modulated via quadrature amplitude modulation (QAM) drawn from a complex symbol alphabet $\mathbb{S}$, are denoted by the vector $\tilde{d} \in \mathbb{C}^{N_u \times 1}$.

The UW-OFDM signal is constructed in two steps. In the first step, $N_u$ zeroes are generated in the time domain at the output of N-point inverse fast Fourier transformation (IFFT) block. The generator matrix $G \in \mathbb{C}^{(N_d+N_u) \times N_d}$ is created to allocate $N_u$ redundant subcarriers to insert $N_u$ zeroes at the last $N_u$ samples of the one OFDM symbol. Compared to the systematic coded UW-OFDM implementation known in the art, the original data symbols $\tilde{d}$, do not appear directly on the subcarriers after being multiplied with the generator matrix G. To minimize the error covariance, the code generator matrix G is selected such that the error covariance of the best linear unbiased estimator (BLUE) at the receiver is minimized. This is satisfied when $G^H G = I$. Moreover, to decrease OOB emission, the $N_u$ zero subcarriers are located at the band edges of the DC subcarrier. The final data vector $\tilde{x}$ in the frequency domain is:

$$\tilde{x} = BG\tilde{d}, \quad (2)$$

where $B \in \mathbb{C}^{N \times (N_d+N_u)}$ maps the usual zero subcarriers to reduce OOB emission. It is similar to identify matrix consisting of zero-rows at the positions of the zero subcarriers.

The UW forms the tail of each OFDM time domain symbol vector using the redundant subcarriers. Hence, an OFDM time domain symbol vector consists of two parts and is of the form $x = [x_d^T x_u^T]^T \in \mathbb{C}^{N \times 1}$. Here, only $x_d \in \mathbb{C}^{(N-N_u) \times 1}$ is random and affected by the data. As a result of the first step, the OFDM symbol time-domain data vector $x' \in \mathbb{C}^{N \times 1}$ is constructed as:

$$x' = F_N^H BG\tilde{d} = \begin{bmatrix} x_d \\ 0 \end{bmatrix}, \quad (3)$$

where $F_N$ denotes the length-N-FFT matrix with elements $$[F_N]_{kl} = e^{-j\frac{2\pi}{N}kl} \text{ for } k, l = 0, 1, \ldots, N-1.$$

The problem of the high energy requirement on redundant subcarriers is solved by implementing non-systematic UW-OFDM. In this scheme, the energy on redundant subcarriers is spread over all subcarriers by exploiting the code generator matrix, G. Define $Q \in \mathbb{C}^{N \times (N_d + N_u)}$ matrix as:

$$F_N^H B = Q = \begin{bmatrix} Q_1 \\ Q_2 \end{bmatrix}, \quad (4)$$

where $Q_1 \in \mathbb{C}^{(N-N_u) \times (N_u+N_d)}$ and $Q_2 \in \mathbb{C}^{N_u \times (N_u+N_d)}$. Then, the generator is decomposed into two different matrices:

$$G = N_{Q_2} C, \quad (5)$$

where $N_{Q_2} = \mathcal{N}(Q_2) \in \mathbb{C}^{(N_u+N_d) \times N_d}$ contains orthonormal null space vectors of $Q_2$. The matrix $C \in \mathbb{C}^{N_d \times N_d}$ is restricted to the case where $C^H C = I$, as this corresponds to the minimization of the BLUE estimator. Similarly, the UW contribution to the time domain OFDM symbol can be written as vector $x_u' \in \mathbb{C}^{N \times 1}$, which is:

$$x_u' = \begin{bmatrix} 0 \\ x_u \end{bmatrix} = F_N^H B J \tilde{x}_u, \quad (6)$$

where J is a matrix similar to generator matrix G, which should be selected to generate the zeroes in the first $N-N_u$ rows of the x at the output of the IFFT. The matrix J is selected as follows:

$$J = \mathcal{N}(Q_1) \quad (7)$$

Define the matrix $T = [T_1^T T_2^T] = F_N^H B J$ to map frequency domain vector $\tilde{x}_u$ into time domain vector $x_u'$. The vector $\tilde{x}_u$ is selected as:

$$\tilde{x}_u = T_2^H (T_2 T_2^H)^{-1} c = T_2^+ c \quad (8)$$

Figure 3:
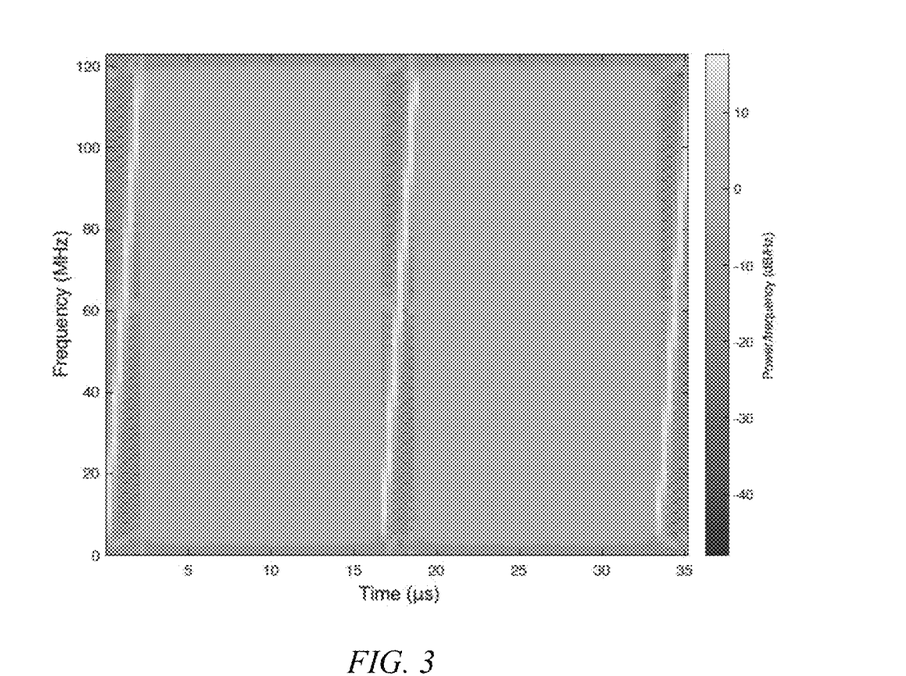
FIG. 3 illustrates a time-frequency representation of an UW-OFDM with chirp, in accordance with an embodiment of the present invention.
Figure 5A:
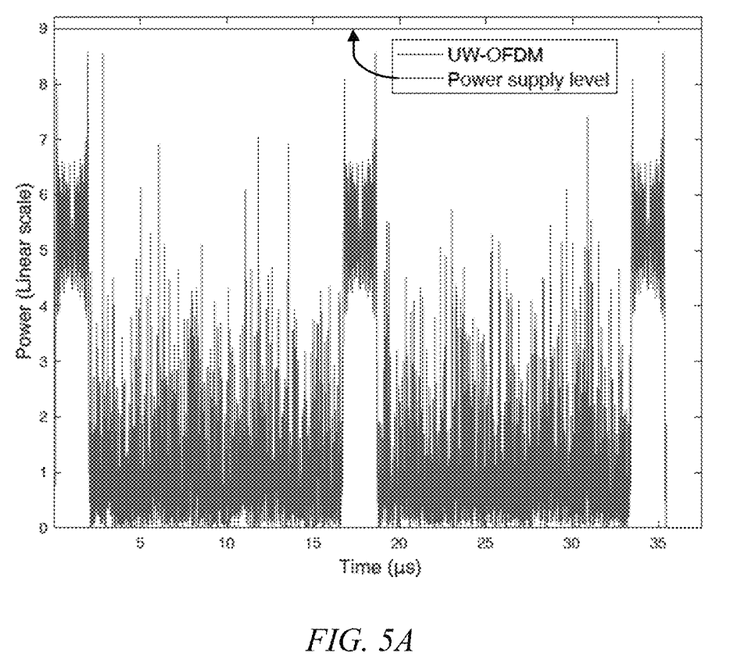
FIG. 5A illustrates the efficient use of PA for UW-OFDM time-power representation, in accordance with an embodiment of the present invention.

Even if pseudo-inverse operation affects the chirp signal generated in the time domain, as shown in seen in FIG. 5A, the linearly increased frequency pattern is not destroyed, which can be seen in FIG. 3. The energy of the UW is increased to use the linear PA efficiently. The power scale is arranged in a way that the power of the UW signal's sample does not pass the peak energy of the other part of the IFFT output, which depends on the data symbols. The power scale of the unique word can be represented as follows:

$$x_u'' = \sigma x_u' \quad (9a)$$

and $$\sigma = \sqrt{\frac{\max\{|x'|^2\}}{\max\{|x_u'|^2\}}} \quad (9b)$$

Figure 5B:
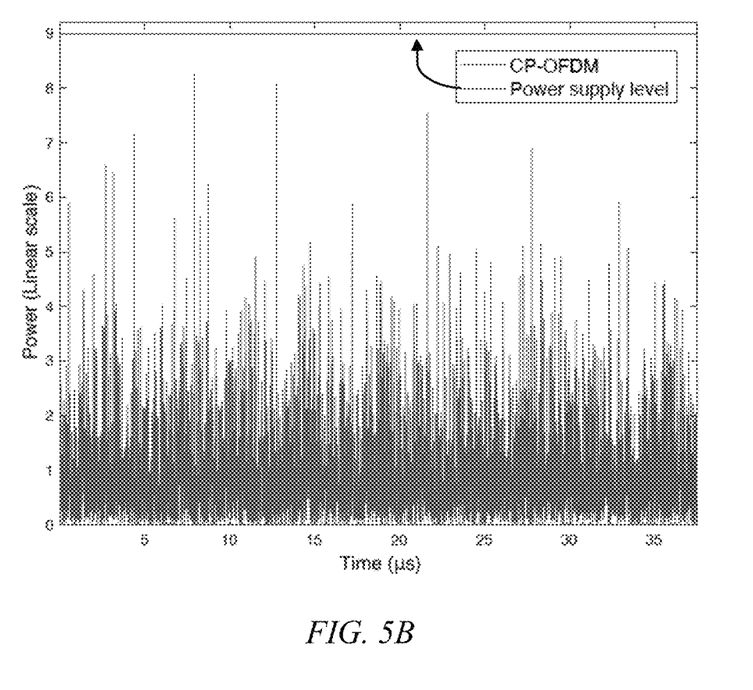
FIG. 5B illustrates the efficient use of PA for CP-OFDM time-power representation.

The generated UW-OFDM signal is depicted in FIG. 5A with comparison of CP-OFDM under the same linear PA input supply level shown in FIG. 5B. Finally, the transmitted signal $x = x' + x_u''$ is upconverted to the desired radio frequency (RF) band.

The Doppler shift and flight time for the paths reflecting from the targets 100, 105, 110, 115 are as shown in FIG. 1 and are assumed to be fixed over a coherent transmission time. Under the linear time-varying channel, the received passband signal is represented as:

$$r(t) = \sum_{p=1}^{P} \alpha_p \Re\{x(t-\tau_p)e^{j2\pi(f_c+\psi_p)(t-\tau_p)+j\bar{\theta}+j\vartheta_p}\} + n(t) \quad (10)$$

where $\alpha_p$, $\tau_p$, and $\vartheta_p$ are the attenuation factor depending on nonfluctuating radar cross section (RCS), time delay related with the distance between the transmitter 120 to target plus target to the receiver 125 or two-way propagation distance (mono or bi-static range) and phase error, respectively. The notation $\psi_p$ is the Doppler frequency associated with the pth path depending on relative speed $v_p$. The number P indicates the number of radar targets; in other words, the number of specular scatterers in the environment. Also, $n(t) \sim \mathcal{CN}(0, \sigma^2)$ denotes the additive white Gaussian noise (AWGN). The attenuation factor $\alpha_p$ is proportional to the large-scale path-loss. Having the path distance d as propagation distance, the path-loss G is:

$$G = \frac{G_{TX} G_{RX} \lambda^2}{(4\pi)^2 d^{PL}} \quad (11)$$

where PL is the path-loss exponent, $\lambda$ is the wavelength, $G_{TX}$ and $G_{RX}$ are the transmit and receive antenna gain, respectively.

The doubly dispersive channel effect in the receiver after sampling at the rate $F_s$, can be represented as finite impulse response (FIR) filter:

$$r[n] = \sum_{p=1}^{P} h[n, \lceil \tau_p/F_s \rceil] x[n - \lceil \tau_p/F_s \rceil] + w[n] \quad (12)$$

where $h[n, \lceil \tau_p/F_s \rceil]$ denotes the channel response of $\lceil \tau_p/F_s \rceil$ samples delayed path at the nth time instant and $w[n]$ is the sampled noise. Based on FIR property of the channel, the received signal can be written in the matrix block representation as:

$$r = Hx + w \quad (13)$$

H is the (N×N) channel matrix representing the convolute operation. For all p channel paths, the matrix H is defined as:

$$H_{nm} = \begin{cases} h[n, \lceil \tau_p/F_s \rceil] & \text{if } n - m = \lceil \tau_p/F_s \rceil \\ 0 & \text{if } n - m \neq \lceil \tau_p/F_s \rceil \end{cases} \quad (14)$$

The following discussion explains the radar-sensing processing for both mono-static and bi-static system architecture using the novel UW-OFDM with chirp sequence, in accordance with the present invention.

Since the transmitted symbols and frame design are known and synchronized in mono-static radar operation, the whole OFDM symbol can be used to estimate range and Doppler shift. In conventional CP-OFDM, periodogram based estimation is used by removing the CP parts of the whole received OFDM signal. Periodogram based estimation is also used in the proposed UW-OFDM with chirp sequence without removing any part of it. The matrix $$K_{TX} = \begin{pmatrix} k_{1,1} & k_{1,2} & \cdots & k_{1,N_d+N_u} \\ k_{2,1} & k_{2,2} & \cdots & k_{2,N_d+N_u} \\ \vdots & \vdots & \ddots & \vdots \\ k_{M,1} & k_{M,2} & \cdots & k_{M,N_d+N_u} \end{pmatrix} \quad (15)$$

where $k_{m,n}$ denotes the complex quantity located on the nth OFDM subcarrier of mth UW-OFDM symbols. After receiving the signal affected by the channel, the matrix $K_{RX}$ denotes the values of complex symbols located on the same indices with $K_{TX}$. $K_{RX}$ contains the effects of delays and Doppler shifts due to speed and range of objects in the environment. Let $N_k$ be the total filled subcarriers $N_k=N_d+N_u$. The modulated complex symbol determined at the transmitter are removed by element-wise division as follows:

$$K_{m,n} = \frac{(K_{RX})_{m,n}}{(K_{TX})_{m,n}} \quad (16)$$

Then, this matrix is utilized to perform periodogram based radar processing. The output power of the periodogram at the mth Doppler and the nth bin is:

$$P(m,n) = \frac{1}{MN_k} \left| \sum_{k=1}^{N_k-1} \left( \sum_{l=1}^{M-1} (K)_{m,n} e^{-j2\pi \frac{lm}{M}} \right) e^{-j2\pi \frac{kn}{N_k}} \right|^2 \quad (17)$$

Sinusoids in K related to object's distance and velocity lead to peaks in P(m,n). Then, certain distance and velocity values can be found from related range and Doppler bin value of peaks.

In bi-static radar processing, the radar processing is done with the chirp sequence in the time domain. Down-converting the received passband signal r(t) into baseband and sampling with the frequency of $F_s = N\Delta f$, the discrete-time signal becomes:

$$y[n] = \sum_{p=1}^{P} h_p x(n/F_s - \tau_p) e^{j2\pi n \psi_p / F_s} + w[n], n \in \mathbb{N}^+ \quad (18a)$$

and $$h_p = \alpha_p e^{-j2\pi(f_c + \psi_p)\tau_p + j\tilde{\theta} + j\vartheta_p} \quad (18b)$$

where $h_p$ is the complex channel gain of target p. Then, the stretch processing is employed in the discrete domain for the superimposed signal to get delays and Doppler shifts estimations. The processed signal in one chirp time interval can be written as:

$$\bar{y}[n'] = y[n'] \times e^{-j\pi(n'/F_s^2/\tau}, n'=1,2,\ldots,\tau F_s \quad (19)$$

and the de-chirping process is repeated for each chirp time interval. Fast-time/slow-time coherent processing interval (CPI) matrix is formed as previously known. However, it is done with the time domain samples. Fast time samples (range bins) are obtained at the rate of $F_s$ from the points on each chirp. Slow-time samples (Doppler bins) are taken from the points on every chirp at the same range bins. Then, periodogram-based estimation method is utilized, yielding peaks at the intersection of $\tau_p$ and $\psi_p$ for each pth target. The threshold to find peak values is determined after several Monte-Carlo simulations.

Estimation of the complex attenuation factor $h_p$ for every pth scatterer (target) can be done in the chirp with the least-square estimation. Besides the estimation of delays $\tau_p$ and Doppler shifts $\psi_p$, estimation of the matrix $h_p$ completes the process to recreate the channel matrix H with some estimation errors. This channel estimation in bi-static radar can be used to demodulate the communication symbols, which is well known in the art.

In the following discussion, the receiver scheme of the proposed transmit frame for communication operations is investigated. Since the receiver can perform radar-sensing functions, the knowledge obtained from the radar process can be leveraged for the data estimation process to improve the performance. After the FFT and subcarrier de-mapping process of the signal, the received signal can be written as:

$$\tilde{y} = B^T F_N H F_N^H B(G\tilde{d} + \sigma J \tilde{x}_u) + B^T F_N w \quad (20)$$

If there is no Doppler shift, the matrix $F_N H F_N^{-1}$ is diagonal and contains the sample channel frequency response on its main diagonal. Let the matrix $\tilde{H} = B^T F_N H F_N^{-1} B$ with $\tilde{H} \in \mathbb{C}^{(N_d+N_u) \times (N_d+N_u)}$ be a down-sized version of the latter removing the indices corresponding to the guard bands.

Here, the communication symbols can be decoded using the estimated channel in the case of bi-static radar scenario. Firstly, the chirp sequence is removed from the total received signal in the frequency domain by using estimate channel matrix $\hat{H}$ as follows:

$$\tilde{y}' = \tilde{y} - \sigma \hat{H} J \tilde{x}_u = \tilde{H} G \tilde{d} + \tilde{v} \quad (21)$$

where $\tilde{v}$ includes both residual error due to successive interference cancellation (SIC) under imperfect channel estimation and noise vector $B^T F_N w$.

The data estimation is obtained by BLUE estimator using Gauss-Markov theorem as follows. The estimated data symbols $\tilde{d}'$ are evaluated as follows:

$$\tilde{d}' = (G^H H^H C^{-1} H G)^{-1} G^H H^H C^{-1} \tilde{y} \quad (22)$$

where the matrix C denotes the covariance matrix $E[\tilde{v}\tilde{v}^H]$. In the case of perfect channel estimation, the covariance matrix is $C=(N_d+N_u)\sigma_n^2 I$, then the estimated data symbols are denoted as follows:

$$\tilde{d}' = E_{BLUE} = (G^H H^H H G)^{-1} G^H H^H \tilde{y} \quad (23)$$

where the equalizer matrix $E_{BLUE}$ is the pseudo-inverse of the matrix HG.

The BER performance of the non-systematic UW-OFDM is numerically analyzed under the assumption of imperfect channel estimation. Here, it is shown that BER performance of UW-OFDM depends on the generator matrix G and outperforms the conventional CP-OFDM due to frequency diversity introduced by spreading of data symbols with the generator matrix G.

In the following discussion, the proposed scheme of the present invention is analyzed regarding its radar performance in the case of both mono-static and bi-static scenarios, OOB emission and efficient power distribution in the time-domain, considering high peak-to-average power ratio (PAPR) of the OFDM signal. Simulation parameters depending on radar and communication requirements are shown in Table I. It is assumed that the maximum delay caused by targets is smaller than the UW length of each OFDM symbol, where UW length is ⅛ of the whole OFDM symbol. This UW to OFDM ratio is in accordance with the conventional CP-OFDM.

TABLE I

Simulation Parameters

| Parameter | Value |
|---|---|
| Carrier frequency ($f_c$) | 60 GHz |
| Bandwidth ($\beta$) | 100 MHz |
| Sample Rate ($F_s$) | 122.88 MHz |
| Chirp duration ($\tau$) | 2.08 µs |
| Subcarrier spacing ($\Delta f$) | 60 kHz |
| Number of FFT (N) | 2048 |
| Number of allocated subcarriers | 1691 |
| Number of guard subcarriers | 101 |
| CP ratio | 1/8 |

Figure 6A:
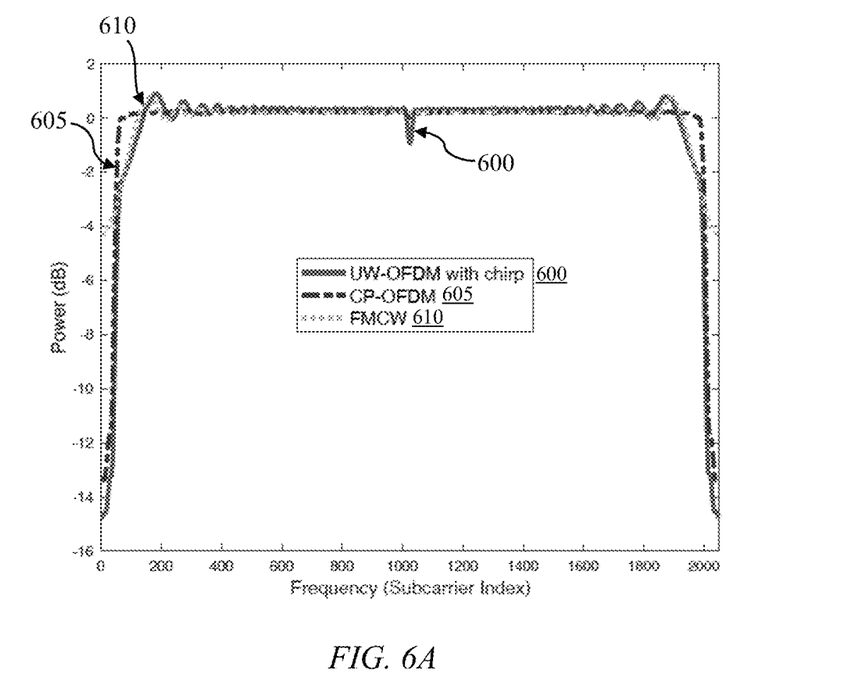
FIG. 6A illustrates the power spectral density of the UW-OFDM with chirp, a CP-OFDM and FMCW for the whole transmission band, in accordance with an embodiment of the present invention.
Figure 6B:
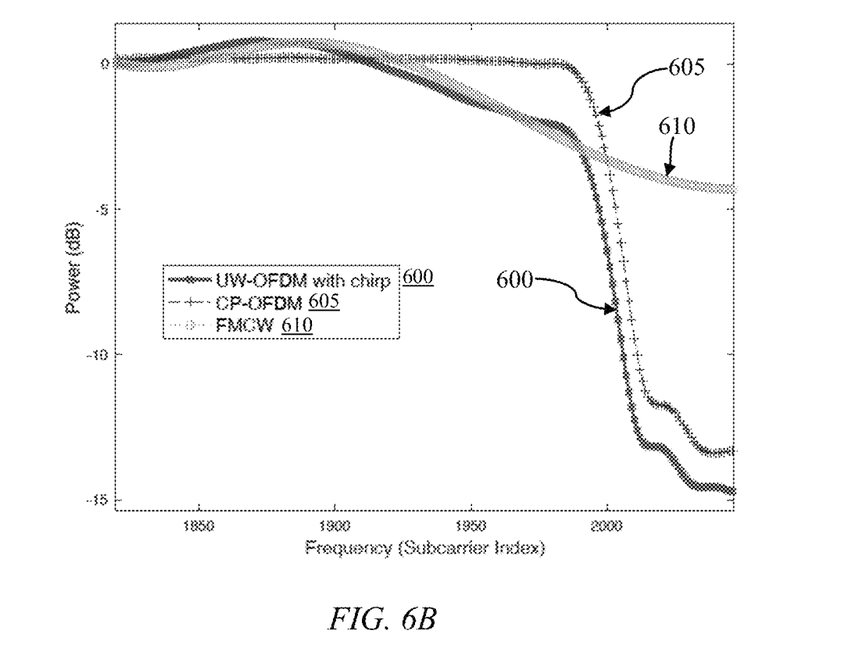
FIG. 6B illustrates the power spectral density of the UW-OFDM with chirp, a CP-OFDM and FMCW for the guard bands, in accordance with an embodiment of the present invention.

As shown in FIG. 6A, the proposed UW-OFDM with chirp waveform 600 has around 1 dB less OOBs emissions than CP-OFDM 605 and has much lower OOB emissions than the FMCW waveform 610. The energy in the redundant subcarriers is distributed with non-systematic UW generation, showing a smoother profile. FIG. 6A illustrates the entire transmission band, which FIG. 6B illustrates the guard bands.

As shown in FIG. 1, the channel includes 4 targets 100, 105, 110, 115 for mono-static operation, with one of the targets 115 blocking the communication signal. The power delay profile (PDP) of the channel is determined as an exponentially decaying function and the amplitude of each tap follows the Raleigh distribution.

Figure 7A:
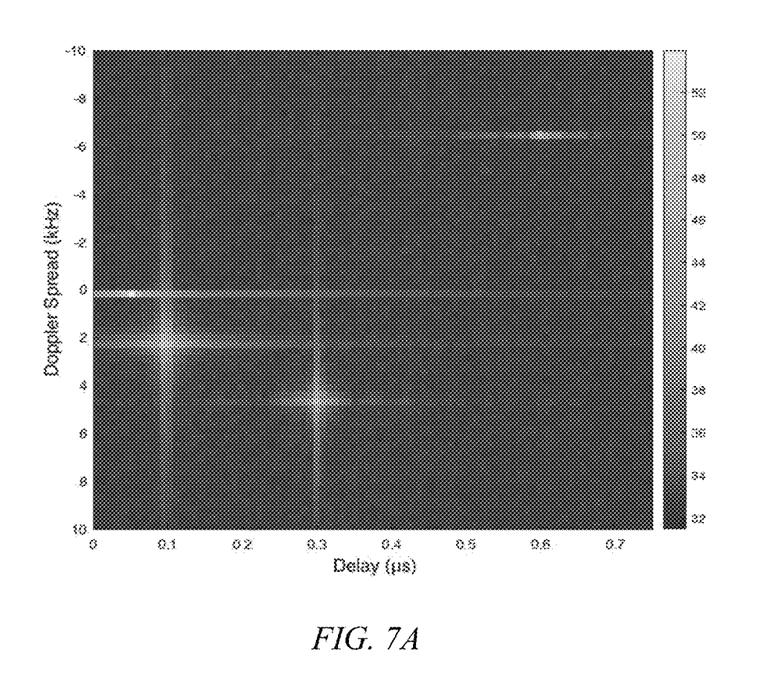
FIG. 7A illustrates radar-sensing performance evaluation of UW-OFDM with chirp waveform for a mono-static system, in accordance with an embodiment of the present invention.
Figure 7B:
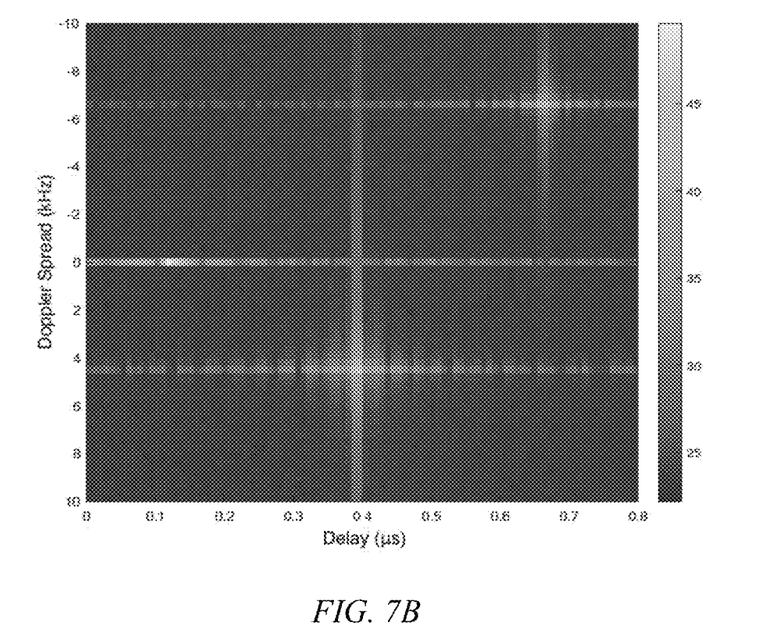
FIG. 7B illustrates radar-sensing performance evaluation of UW-OFDM with chirp waveform for a bi-static system, in accordance with an embodiment of the present invention.

FIG. 7A and FIG. 7B illustrate the radar-sensing performance when the noise power is fixed. FIG. 7A illustrates the radar-sensing performance evaluation of the UW-OFDM with chirp waveform under mono-static conditions. FIG. 7A illustrates the radar-sensing performance evaluation of the UW-OFDM with chirp waveform under bi-static conditions.

Figure 4:
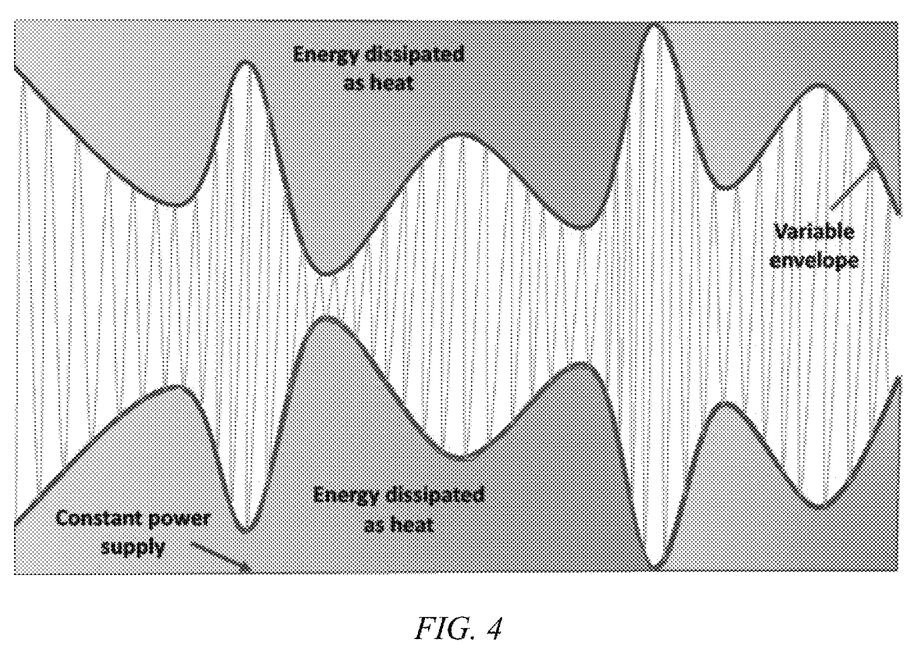
FIG. 4 illustrates a schematic of energy loss in linear power amplifier (PA), in accordance with an embodiment of the present invention.

The signal power changes accordingly by assuming the usage of constant power supply linear PA, as visualized in FIG. 4. Additionally, as shown in a comparison of FIG. 5A and FIG. 5B, which illustrate the efficient use of linear PA, it can be seen that with the proposed UW-OFDM with chirp waveform (FIG. 5A) less energy is dissipated as heat, as compared to the CP-OFDM waveform (FIG. 5B). Velocity and range of targets for both mono-static and bi-static systems can be estimated with a proper threshold level. In the bi-static radar case, after evaluating the complex attenuation factor $h_p$ denoted in (18b), the estimation of channel matrix $\hat{H}$ can be created by using the obtained values of Doppler shifts and delays, which is done previously via chirp waveform in the UW part. Using $\hat{H}$, the communication symbols can be demodulated.

The advantages of using UW-OFDM in JRC systems over CP-OFDW can be itemized as follows: (1) No need for CP removal in periodogram based radar processing, which increases maximum resolvable velocity; (2) Less OOBs emission; (3) Improved power efficiency by using chirp as UW; (4) Feasible for both mono-static and bi-static radar.

Accordingly, the present invention provides a novel joint radar-sensing and communication (JRC) transmission-reception frame using UW-OFDM with chirp sequence. In various embodiments, the chirp sequence is used as UW to perform radar functionality in mono-static and bi-static radar cases. The proposed structure is compared with the conventional CP-OFDM in terms of power characteristics and radar-sensing functionality and shown to perform better. Moreover, since it provides inherent diversity that enhances BER performance, the proposed scheme is promising for future applications.

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A method for assembling unique word (UW)—orthogonal frequency division multiplexing (OFDM) data symbols for use in joint radar-sensing and communication (JRC), the method comprising:
  generating OFDM time domain symbols having $N_u$ zeroes at an output of an N-point inverse fast Fourier transformation (IFFT) block of a transmitter, wherein $N_u$ is an integer greater than one; and
  adding a predetermined chirp sequence in the $N_u$ zeroes to assemble UW-OFDM symbols having a chirp sequence, wherein the UW is the predetermined chirp sequence for joint radar-sensing and communication (JRC).

2. The method of claim 1, wherein the predetermined chirp sequence forms a tail of each of the OFDM time domain symbols.

3. The method of claim 1, wherein generating the OFDM time domain symbols having $N_u$ zeroes at the output of the N-point inverse fast Fourier transformation (IFFT) block further comprises:
  providing OFDM frequency domain symbols to a code generator matrix to introduce redundancy into the OFDM frequency domain symbols; and
  modulating the OFDM frequency domain symbols having redundancy on a plurality of subcarriers using the IFFT block to generate the OFDM time domain symbols having $N_u$ zeroes.

4. The method of claim 3, wherein the redundancy introduced into the OFDM frequency domain by the code generator matrix is distributed over the plurality of subcarriers.

5. The method of claim 1, wherein the JRC is mono-static JRC.

6. The method of claim 1, wherein the JRC is bi-static JRC.

7. The method of claim 1, further comprising:
  transmitting, by the transmitter, the UW-OFDM symbols having a chirp sequence over a channel;
  receiving the UW-OFDM symbols having a chirp sequence at a receiver; and
  decoding the UW-OFDM symbols having a chirp sequence using a best linear unbiased estimator (BLUE) that is matched to the code generator matrix.

8. A method for assembling unique word (UW)—orthogonal frequency division multiplexing (OFDM) data symbols for use in joint radar-sensing and communication (JRC), the method comprising:
  providing OFDM frequency domain symbols to a code generator matrix of a transmitter to introduce redundancy into the OFDM frequency domain symbols;
  modulating the OFDM frequency domain symbols having redundancy on a plurality of subcarriers using the IFFT block to generate OFDM time domain symbols having $N_u$ zeroes, wherein $N_u$ is an integer greater than one; and
  adding a predetermined chirp sequence in the $N_u$ zeroes to assemble UW-OFDM symbols having a chirp sequence, wherein the UW is the predetermined chirp sequence for joint radar-sensing and communication (JRC).

9. The method of claim 8, further comprising:
  transmitting, by the transmitter, the UW-OFDM symbols having a chirp sequence over a channel;
  receiving the UW-OFDM symbols having a chirp sequence at a receiver; and
  decoding the UW-OFDM symbols having a chirp sequence using a best linear unbiased estimator (BLUE) at the receiver that is matched to the code generator matrix.

10. A transmitter for assembling unique word (UW)—orthogonal frequency division multiplexing (OFDM) data symbols for use in joint radar-sensing and communication (JRC), the transmitter comprising:
  an N-point inverse fast Fourier transformation (IFFT) block to generate OFDM time domain symbols having $N_u$ zeroes at an output, wherein $N_u$ is an integer greater than one; and
  the transmitter to add a predetermined chirp sequence in the $N_u$ zeroes to assemble UW-OFDM symbols having a chirp sequence, wherein the UW is the predetermined chirp sequence for joint radar-sensing and communication (JRC).

11. The transmitter of claim 10, wherein the predetermined chirp sequence forms a tail of each of the OFDM time domain symbols.

12. The transmitter of claim 10, wherein the N-point inverse fast Fourier transformation (IFFT) block further is further configured to:
  provide OFDM frequency domain symbols to a code generator matrix to introduce redundancy into the OFDM frequency domain symbols; and
  module the OFDM frequency domain symbols having redundancy on a plurality of subcarriers using the IFFT block to generate the OFDM time domain symbols having $N_u$ zeroes.

13. The transmitter of claim 12, wherein the redundancy introduced into the OFDM frequency domain by the code generator matrix is distributed over the plurality of subcarriers.

14. The transmitter of claim 10, wherein the JRC is mono-static JRC.

15. The transmitter of claim 10, wherein the JRC is bi-static JRC.

16. The transmitter of claim 10, further comprising:
  a receiver configured to receive the UW-OFDM symbols having a chirp sequence transmitted by the transmitter over a channel; and
  the receiver configured to decode the UW-OFDM symbols having a chirp sequence using a best linear unbiased estimator (BLUE) that is matched to the code generator matrix.

* * * * *